US00RE39637E

(19) United States
(12) Reissued Patent
Roberts et al.

(10) Patent Number: US RE39,637 E
(45) Date of Reissued Patent: May 22, 2007

(54) HYBRID CYCLE FOR THE PRODUCTION OF LIQUEFIED NATURAL GAS

(75) Inventors: Mark Julian Roberts, Kempton, PA (US); Rakesh Agrawal, Emmaus, PA (US)

(73) Assignee: Air Products and Chemicals, Inc., Allentown, PA (US)

(21) Appl. No.: 10/669,121

(22) Filed: Sep. 23, 2003

Related U.S. Patent Documents

Reissue of:
(64) Patent No.: 6,308,531
Issued: Oct. 30, 2001
Appl. No.: 09/416,042
Filed: Oct. 12, 1999

(51) Int. Cl.
*F25J 1/00* (2006.01)

(52) U.S. Cl. ..... 62/611; 62/612
(58) Field of Classification Search ..... 62/611, 62/612, 606, 912, 335
See application file for complete search history.

(56) References Cited

U.S. PATENT DOCUMENTS

| | | | |
|---|---|---|---|
| 3,511,058 | A | 5/1970 | Becker |
| 3,747,359 | A | 7/1973 | Streich |
| 3,763,658 | A | 10/1973 | Gaumer et al. |
| 4,251,247 | A | 2/1981 | Gauberthier et al. |

(Continued)

FOREIGN PATENT DOCUMENTS

| | | |
|---|---|---|
| DE | 24 40 215 A | 3/1976 |
| DE | 2440215 | 3/1976 |
| DE | 24 40 215 | 3/1976 |
| EP | 0 053 536 | 6/1982 |

(Continued)

OTHER PUBLICATIONS

Finn A J et al: "Developments in Natural Gas Liquefaction", Hydrocarbon Processing, Gulf Publishing Co. Houston, US, vol. 78, No. 4, Apr. 1999 (1999–04) pp. 47–50, 53–56, 58–59, XP–000825425 ISSN: 0018–8190.

(Continued)

*Primary Examiner*—William C. Doerrler
(74) *Attorney, Agent, or Firm*—Willard Jones, II

(57) ABSTRACT

[Refrigeration process for gas liquefaction which utilizes one or more vaporizing refrigerant cycles to provide refrigeration below about −40° C. and a gas expander cycle to provide refrigeration below about −100° C. Each of these two types of refrigerant systems is utilized in an optimum temperature range which maximizes the efficiency of the particular system. A significant fraction of the total refrigeration power required to liquefy the feed gas (typically more than 5% and often more than 10% of the total) can be consumed by the vaporizing refrigerant cycles. The invention can be implemented in the design of a new liquefaction plant or can be utilized as a retrofit or expansion of an existing plant by adding gas expander refrigeration circuit to the existing plant refrigeration system.] *Method for the liquefaction of a feed gas which comprises providing at least a portion of the total refrigeration required to cool and condense the feed gas by utilizing a first refrigeration system comprising at least one recirculating refrigeration circuit, wherein the first refrigeration system utilizes two or more refrigerant components and provides refrigeration in a first temperature range, and a second refrigeration system which provides refrigeration in a second temperature range by work expanding a pressurized gaseous refrigerant stream. Compressed refrigerant in the first refrigeration system may be cooled by refrigeration provided by a third refrigeration system. Compressed refrigerant in the second refrigeration system may be cooled by refrigeration provided by a third refrigeration system. At least a portion of the pressurized gaseous refrigerant stream, prior to work expansion, may be entirely cooled separately from cooling of the feed gas.*

20 Claims, 9 Drawing Sheets

U.S. PATENT DOCUMENTS

| | | | | | |
|---|---|---|---|---|---|
| 4,274,849 | A | | 6/1981 | Garier et al. | |
| 4,334,902 | A | * | 6/1982 | Paradowski | 62/614 |
| 4,525,185 | A | | 6/1985 | Newton | |
| 4,755,200 | A | * | 7/1988 | Liu et al. | 62/612 |
| 4,970,867 | A | | 11/1990 | Herron et al. | |
| 5,611,216 | A | | 3/1997 | Low et al. | |
| 5,701,761 | A | | 12/1997 | Alexandre et al. | |
| 5,768,912 | A | * | 6/1998 | Dubar | 62/613 |
| 5,826,444 | A | | 10/1998 | Capron et al. | |
| 5,832,745 | A | | 11/1998 | Klein Nagelvoort et al. | |
| 6,041,620 | A | | 3/2000 | Olszewski et al. | |
| 6,041,621 | A | | 3/2000 | Olszewski et al. | |
| 6,065,305 | A | | 5/2000 | Arman et al. | |

FOREIGN PATENT DOCUMENTS

| | | | |
|---|---|---|---|
| FR | 2 201 444 | A | 4/1974 |
| WO | WO 9527179 | | 10/1995 |
| WO | WO 9611370 | | 4/1996 |
| WO | WO 9713109 | | 4/1997 |
| WO | WO 99/60316 | A | 11/1999 |
| WO | WO 99 60316 | A | 11/1999 |
| WO | WO 9960316 | | 11/1999 |

OTHER PUBLICATIONS

"SDG&E: Experience Pays Off for Peaking Shaving Pioneer" in Cryogenics & Industrial Gases, Sep./Oct. 1971, pp. 25–28.

Muller, K., et al., "Natural Gas Liquefaction by an Expansion Turbine Mixture Cycle" in Chemical Economy & Engineering Reivew, vol. 8, No. 10 (No. 99), Oct. 1976.

The Liquefaction of Natural Gas in the Refrigeration Cycle with Expansion Turbine in Erdol and Kohle–Erdgas–Petrochemic Breenst–Chem vol. 27, No. 7, 379–380 (Jul. 1974).

Finn A J et al: "Developments in Natural Gas Liquefaction", Hydrocarbon Processing, Gulf Publishing Co., Houston, Texas, vol. 78, No. 4, ,Apr. 1999 (1999–04) pp. 47–50, 53–56, 58–59, XP000825425.

* cited by examiner

HYBRID CYCLE FOR THE PRODUCTION OF LIQUEFIED NATURAL GAS

Matter enclosed in heavy brackets [ ] appears in the original patent but forms no part of this reissue specification; matter printed in italics indicates the additions made by reissue.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The production of liquefied natural gas (LNG) is achieved by cooling and condensing a feed gas stream against multiple refrigerant streams provided by recirculating refrigeration systems. Cooling of the natural gas feed is accomplished by various cooling process cycles such as the well-known cascade cycle in which refrigeration is provided by three different refrigerant loops. One such cascade cycle uses methane, ethylene and propane cycles in sequence to produce refrigeration at three different temperature levels. Another well-known refrigeration cycle uses a propane pre-cooled, mixed refrigerant cycle in which a multicomponent refrigerant mixture generates refrigeration over a selected temperature range. The mixed refrigerant can contain hydrocarbons such as methane, ethane, propane, and other light hydrocarbons, and also may contain nitrogen. Versions of this efficient refrigeration system are used in many operating LNG plants around the world.

Another type of refrigeration process for natural gas liquefaction involves the use of a nitrogen expander cycle in which nitrogen gas is first compressed and cooled to ambient conditions with air or water cooling and then is further cooled by counter-current exchange with cold low-pressure nitrogen gas. The cooled nitrogen stream is then work expanded through a turbo-expander to produce a cold low pressure stream. The cold nitrogen gas is used to cool the natural gas feed and the high pressure nitrogen stream. The work produced by the nitrogen expansion can be used to drive a nitrogen booster compressor connected to the shaft of the expander. In this process, the cold expanded nitrogen is used to liquefy the natural gas and also to cool the compressed nitrogen gas in the same heat exchanger. The cooled pressurized nitrogen is further cooled in the work expansion step to provide the cold nitrogen refrigerant.

Refrigeration systems utilizing the expansion of nitrogen-containing refrigerant gas streams have been utilized for small liquefied natural gas (LNG) facilities typically used for peak shaving. Such systems are described in papers by K. Müller et al entitled "Natural Gas Liquefaction by an Expansion Turbine Mixture Cycle" in Chemical Economy & Engineering Review, Vol. 8, No. 10 (No. 99), October 1976 and "The Liquefaction of Natural Gas in the Refrigeration Cycle with Expansion Turbine" in Erdöl und Kohie—Erdgas—Petrochemie Brennst-Chem Vol. 27, No. 7, 379–380 (July 1974). Another such system is described in an article entitled "SDG&E: Experience Pays Off for Peak Shaving Pioneer" in Cryogenics & Industrial Gases, September/October 1971, pp. 25–28.

U.S. Pat. No. 3,511,058 describes a LNG production system using a closed loop nitrogen refrigerator with a gas expander or reverse Brayton type cycle. In this process, liquid nitrogen is produced by means of a nitrogen refrigeration loop utilizing two turbo-expanders. The liquid nitrogen produced is further cooled by a dense fluid expander. The natural gas undergoes final cooling by boiling the liquid nitrogen produced from the nitrogen liquefier. Initial cooling of the natural gas is provided by a portion of the cold gaseous nitrogen discharged from the warmer of the two expanders in order to better match cooling curves in the warm end of the heat exchanger. This process is applicable to natural gas streams at sub-critical pressures since the gas is liquefied in a free-draining condenser attached to a phase separator drum.

U.S. Pat. No. 5,768,912 (equivalent to International Patent Publication WO 95/27179) discloses a natural gas liquefaction process which uses nitrogen in a closed loop Brayton type refrigeration cycle. The feed and the high pressure nitrogen can be pre-cooled using a small conventional refrigeration package employing propane, freon, or ammonia absorption cycles. This pre-cooling refrigeration system utilizes about 4% of total power consumed by the nitrogen refrigeration system. The natural gas is then liquefied and sub-cooled to −149° C. using a reverse Brayton or turbo-expander cycle employing two or three expanders arranged in series relative to the cooling natural gas.

A mixed refrigerant system for natural gas liquefaction is described in International Patent Publication WO 96/11370 in which the mixed refrigerant is compressed, partially condensed by an external cooling fluid, and separated into liquid and vapor phases. The resulting vapor is work expanded to provide refrigeration to the cold end of the process and the liquid is sub-cooled and vaporized to provide additional refrigeration.

International Patent Publication WO 97/13109 discloses a discloses a natural gas liquefaction process which uses nitrogen in a closed loop reverse Brayton-type refrigeration cycle. The natural gas at supercritical pressure is cooled against the nitrogen refrigerant, expanded isentropically, and stripped in a fractionating column to remove light components.

The liquefaction of natural gas is very energy-intensive. Improved efficiency of gas liquefaction processes is highly desirable and is the prime objective of new cycles being developed in the gas liquefaction art. The objective of the present invention, as described below and defined by the claims which follow, is to improve liquefaction efficiency by providing two integrated refrigeration systems wherein one of the systems utilizes one or more vaporizing refrigerant cycles to provide refrigeration down to about −100° C. and utilizes a gas expander cycle to provide refrigeration below about −100° C. Various embodiments are described for the application of this improved refrigeration system which enhance the improvements to liquefaction efficiency.

BRIEF SUMMARY OF THE INVENTION

The invention relates to a method for the liquefaction of a feed gas, which *method* comprises providing at least a portion of the total refrigeration required to cool and condense the feed gas by utilizing (a) a first refrigeration system comprising at least one recirculating refrigeration circuit, wherein the first refrigeration system utilizes two or more refrigerant components and provides refrigeration in a first temperature range; and (b) a second refrigeration system which provides refrigeration in a second temperature range by work expanding a pressurized gaseous refrigerant stream.

The first recirculating refrigeration system may be operated by (1) compressing a first gaseous refrigerant;

(2) cooling and at least partially condensing the resulting compressed refrigerant;

(3) reducing the pressure of the resulting at least partially condensed compressed refrigerant;

(4) vaporizing the resulting reduced-pressure refrigerant to provide refrigeration in the first temperature range and yield a vaporized refrigerant; and (5) recirculating the vaporized refrigerant to provide the first gaseous refrigerant of (1).

At least a portion of the cooling in (2) may be provided by indirect heat exchange with one or more additional vaporizing refrigerant streams provided by a third [recirculating] refrigeration [circuit] *system*. The third [recirculating] refrigeration [circuit] *system* may utilize a single component refrigerant or alternatively may utilize a mixed refrigerant comprising two or more components.

In an alternative embodiment, the invention relates to a method for the liquefaction of a feed gas which comprises providing at least a portion of the total refrigeration required to cool and condense the feed gas by utilizing (a) a first refrigeration system comprising at least one recirculating refrigeration circuit, wherein the first refrigeration system utilizes two or more refrigerant components and provides refrigeration in a first temperature range; and (b) a second refrigeration system which provides refrigeration in a second temperature range by work expanding a pressurized gaseous refrigerant stream. The second recirculating refrigeration system may be operated by (1) compressing a second gaseous refrigerant to provide the pressurized gaseous refrigerant in (b);

(2) cooling the pressurized gaseous refrigerant to yield a cooled gaseous refrigerant;

(3) work expanding the cooled gaseous refrigerant to provide the cold refrigerant in (b);

(4) warming the cold refrigerant to provide refrigeration in the second temperature range; and (5) recirculating the resulting warmed refrigerant to provide the second gaseous refrigerant of (1).

At least a portion of the cooling in (2) may be provided by indirect heat exchange with one or more additional vaporizing refrigerants provided by a third [recirculating] refrigeration [circuit] *system*.

The third [recirculating] refrigeration [circuit] *system* may utilize a single component refrigerant or a mixed refrigerant which comprises two or more components.

In another alternative embodiment, the invention relates to a method for the liquefaction of a feed gas which comprises providing at least a portion of the total refrigeration required to cool and condense the feed gas by utilizing (a) a first refrigeration system comprising at least one recirculating refrigeration circuit, wherein the first refrigeration system utilizes two or more refrigerant components and provides refrigeration in a first temperature range[;] and (b) a second refrigeration system which provides refrigeration in a second temperature range by work expanding a pressurized gaseous refrigerant stream. The first refrigerant system may be operated by (1) compressing a first gaseous refrigerant;

(2) cooling and partially condensing the resulting compressed refrigerant to yield a vapor refrigerant fraction and a liquid refrigerant fraction;

(3) further cooling and reducing the pressure of the liquid refrigerant fraction, and vaporizing the resulting liquid refrigerant fraction to provide refrigeration in the first temperature range and yield a first vaporized refrigerant;

(4) cooling and condensing the vapor refrigerant fraction, reducing the pressure of at least a portion of the resulting liquid, and vaporizing the resulting liquid refrigerant fraction to provide additional refrigeration in the first temperature range and yield a second vaporized refrigerant; and (5) combining the first and second vaporized refrigerants to provide the first gaseous refrigerant of (1).

*The* [V] *v*aporization of the resulting liquid in (4) may be effected at a pressure lower than the vaporization of the resulting liquid refrigerant fraction in (3), and the second vaporized refrigerant may be compressed before combining with the first vaporized refrigerant.

In a further alternative embodiment, the invention relates to a method for the liquefaction of a feed gas which comprises providing at least a portion of the total refrigeration required to cool and condense the feed gas by utilizing (a) a first refrigeration system comprising at least one recirculating refrigeration circuit, wherein the first refrigeration system utilizes two or more refrigerant components and provides refrigeration in a first temperature range; and (b) a second refrigeration system which provides refrigeration in a second temperature range by work expanding a pressurized gaseous refrigerant stream. The second recirculating refrigeration system may be operated by (1) compressing a second gaseous refrigerant to provide the pressurized gaseous refrigerant in (b);

(2) cooling the pressurized gaseous refrigerant to yield a cooled gaseous refrigerant;

(3) work expanding the cooled gaseous refrigerant to provide the cold refrigerant in (b);

(4) warming the cold refrigerant to provide refrigeration in the second temperature range; and (5) recirculating the resulting warmed refrigerant to provide the second gaseous refrigerant of (1).

The feed gas may be natural gas, the resulting liquefied natural gas stream may be flashed to lower pressure to yield a light flash vapor and a final liquid product, and the light flash vapor may be used to provide the second gaseous refrigerant in the second [refrigerant circuit] *refrigeration system*.

*Another embodiment of the invention relates to a method for the liquefaction of a feed gas which comprises providing at least a portion of the total refrigeration required to cool and condense the feed gas by utilizing (a) a first refrigeration system comprising at least one recirculating refrigeration circuit, wherein the first refrigeration system utilizes two or more refrigerant components and provides refrigeration in a first temperature range, and (b) a second refrigeration system which provides refrigeration in a second temperature range by work expanding a pressurized gaseous refrigerant stream. The second refrigeration system is operated by*

*(1) compressing a second gaseous refrigerant to provide the pressurized gaseous refrigerant in (b);*

*(2) cooling the pressurized gaseous refrigerant to yield a cooled gaseous refrigerant;*

*(3) work expanding the cooled gaseous refrigerant to provide the cold refrigerant in (b);*

*(4) warming the cold refrigerant to provide refrigeration in the second temperature range; and*

*(5) recirculating the resulting warmed refrigerant to provide the second gaseous refrigerant of (1).*

*At least a portion of the pressurized gaseous refrigerant in (2) is entirely cooled separately from cooling of the feed gas. All of the pressurized gaseous refrigerant may be cooled separately from cooling of the feed gas.*

*A portion of the pressurized gaseous refrigerant may be cooled by indirect heat exchange with the at least one recirculating refrigeration circuit of (a). The first refrigeration system may comprise a mixed component, pure component, and/or a cascaded vapor recompression refrigeration system.*

*Another embodiment of the invention includes an apparatus for the liquefaction of a feed gas comprising*

*(a) a first refrigeration system comprising at least one recirculating refrigeration circuit, wherein the first refrigeration system utilizes two or more refrigerant components and provides refrigeration in a first temperature range, wherein at least a portion of the first temperature range is between −40° C. and −100° C.; and*

*(b) a second refrigeration system which provides refrigeration in a second temperature range by work expanding a pressurized gaseous refrigerant stream, wherein at least a portion of the second temperature range is below −100° C.*

*The first refrigeration system comprises*

*(1) compression means for comprising a first gaseous refrigerant;*

*(2) heat exchange means for cooling and at least partially condensing the resulting compressed refrigerant;*

*(3) means for reducing the pressure of the resulting at least partially condensed compressed refrigerant;*

*(4) heat exchange means for vaporizing the resulting reduced-pressure refrigerant to provide refrigeration in the first temperature range and yield a vaporized refrigerant; and*

*(5) means for recirculating the vaporized refrigerant to provide the first gaseous refrigerant of (1).*

*The apparatus may comprise additional heat exchange means to provide at least a portion of the cooling of (2) by indirect heat exchange with one or more additional vaporizing refrigerant streams and a third refrigeration system to provide the one or more additional vaporizing refrigerant streams.*

*In this embodiment, the second refrigeration system may comprise*

*(6) compression means for compressing a second gaseous refrigerant to provide the pressurized gaseous refrigerant;*

*(7) heat exchange means for cooling the pressurized gaseous refrigerant to yield a cooled gaseous refrigerant;*

*(8) expansion means for work expanding the cooled gaseous refrigerant to provide the cold refrigerant;*

*(9) heat exchange means for warming the cold refrigerant to provide refrigeration in the second temperature range; and*

*(10) means for recirculating the resulting warmed refrigerant to provide the second gaseous refrigerant of (6).*

*At least one of the heat exchange means in the first and second refrigeration systems of this embodiment may comprise a wound coil heat exchanger.*

*A final embodiment of the invention relates to an apparatus for the liquefaction of a feed gas comprising*

*(a) a first refrigeration system comprising at least one recirculating refrigeration circuit utilizing two or more refrigerant components and providing refrigeration in a first temperature range; and*

*(b) a second refrigeration system which provides refrigeration in a second temperature range having a lowest temperature less than the lowest temperature in the first temperature range.*

*The second refrigeration system comprises*

*(1) compression means for compressing the second gaseous refrigerant to provide the pressurized gaseous refrigerant;*

*(2) heat exchange means for entirely cooling at least a portion of the pressurized gaseous refrigerant separately from cooling of the feed gas to yield at least a portion of the cooled gaseous refrigerant;*

*(3) expansion means for work expanding the cooled gaseous refrigerant to provide the cold refrigerant;*

*(4) heat exchange means for warming the cold refrigerant to provide refrigeration in the second temperature range; and*

*(5) means for recirculating the resulting warmed refrigerant to provide the second gaseous refrigerant of (1).*

*In this embodiment, the heat exchange means of (2) may cool all of the pressurized gaseous refrigerant separately from cooling of the feed gas. The first refrigeration system may comprise*

*(A) compression means for compressing the first gaseous refrigerant;*

*(B) heat exchange means for cooling and at least partially condensing the resulting compressed refrigerant;*

*(C) pressure reducing means for reducing the pressure of the resulting at least partially condensed compressed refrigerant;*

*(D) heat exchange means for vaporizing the resulting reduced-pressure refrigerant to provide refrigeration in the first temperature range and yield the vaporized refrigerant; and*

*(E) means for recirculating the vaporized refrigerant to provide the first gaseous refrigerant of (A).*

*In this embodiment, at least a portion of the cooling in the heat exchanger of (2) may be provided by indirect heat exchange by warming the cold refrigerant in (4). At least one of the heat exchange means of the first and second refrigeration systems may comprise a wound coil heat exchanger.*

DETAILED DESCRIPTION OF THE INVENTION

Figure 1:
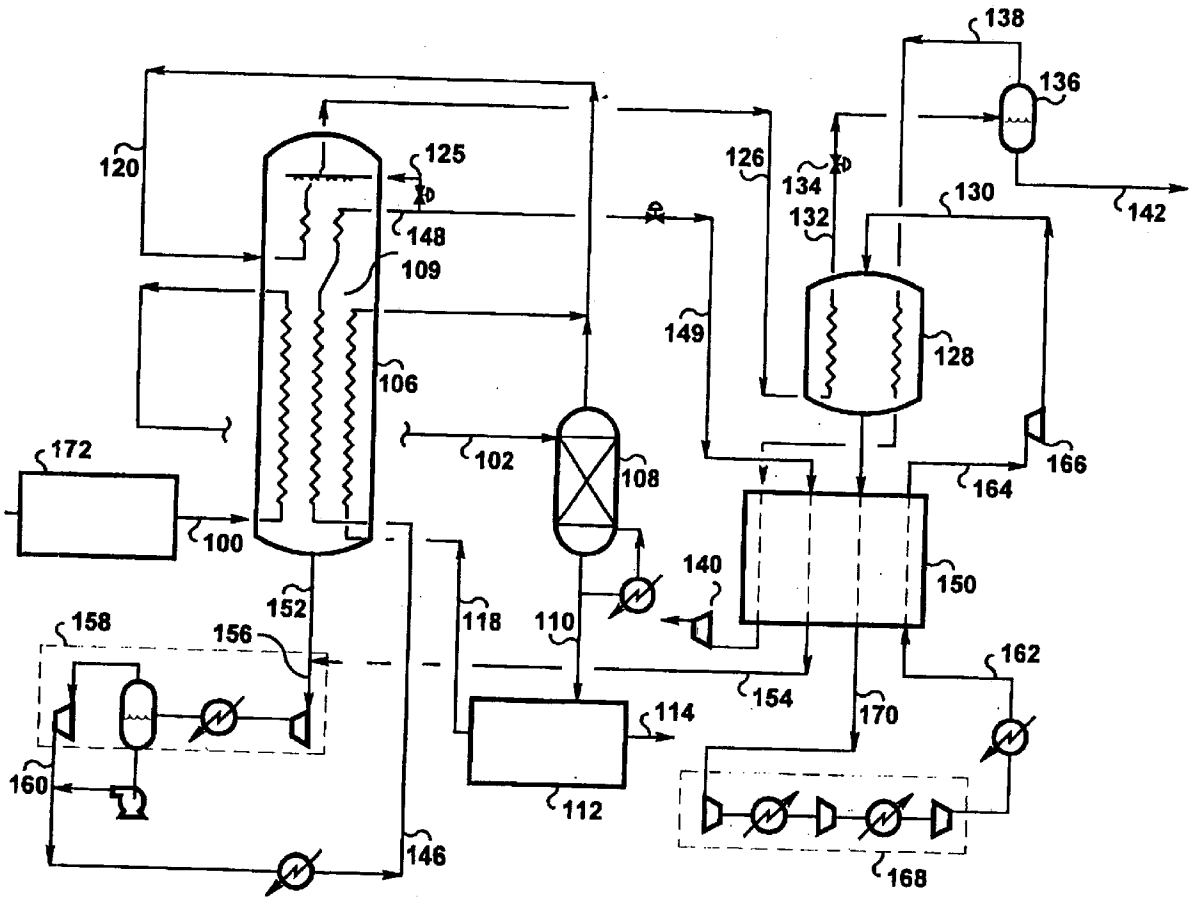
FIG. 1 is a schematic flow diagram of a preferred embodiment of the present invention.

Most LNG production plants today utilize refrigeration produced by compressing a gas to a high pressure, liquefying the gas against a cooling source, expanding the resulting liquid to a low pressure, and vaporizing the resulting liquid to provide the refrigeration. Vaporized refrigerant is recompressed and utilized again in the recirculating refrigeration circuit. This type of refrigeration process can utilize a multi-component mixed refrigerant or a cascaded single component refrigerant cycle for cooling, and is defined generically herein as a vaporizing refrigerant cycle or as a vapor recompression cycle. This type of cycle is very efficient at providing cooling at near ambient temperatures. In this case, refrigerant fluids are available which will condense at a pressure well below the refrigerant critical pressure while rejecting heat to an ambient temperature heat sink, and will also boil at a pressure above atmospheric while absorbing heat from the refrigeration load.

As the required refrigeration temperature decreases in a single component vapor compression refrigeration system, a particular refrigerant which boils above atmospheric pressure at a temperature low enough to provide the required refrigeration will be too volatile to condense against an ambient temperature heat sink because the refrigerant critical temperature is below ambient temperature. In this situation, cascade cycles can be employed. For example, a two-fluid cascade can be utilized in which a heavier fluid provides the warmer refrigeration while a lighter fluid provides the colder refrigeration. Rather than rejecting heat to an ambient temperature, however, the light fluid rejects heat to the boiling heavier fluid while itself condensing. Very low temperatures can be reached by cascading multiple fluids in this manner.

A multi-component refrigeration (MCR) cycle can be considered as a type of cascade cycle in which the heaviest components of the refrigerant mixture condense against the ambient temperature heat sink and boil at low pressure while condensing the next lighter component which itself will boil to provide condensing to the still lighter component, and so on, until the desired temperature is reached. The main advantage of a multi-component system over a cascaded system is that the compression and heat exchange equipment is greatly simplified. The multi-component system requires a single compressor and heat exchanger, while the cascade system requires multiple compressors and heat exchangers.

Both of these cycles become less efficient as the temperature of the refrigeration load decreases because of the necessity to cascade multiple fluids. To provide the temperatures (typically −220° F. to −270° F.) required for LNG production, multiple steps involving multiple components are employed. In each step there are thermodynamic losses associated with the boiling/condensing heat transfer across a finite temperature difference, and with each additional step these losses increase.

Another type of industrially important refrigeration cycle is the gas expander cycle. In this cycle the working fluid is compressed, cooled sensibly (without phase change), work expanded as a vapor in a turbine, and warmed while providing cooling to the refrigeration load. This cycle is also defined as a gas expander cycle. Very low temperatures can be obtained relatively efficiently with this type of cycle using a single recirculating cooling loop. In this type of cycle, the working fluid typically does not undergo phase change, so heat is absorbed as the fluid is warmed sensibly. In some cases, however, the working fluid can undergo a small degree of phase change during work expansion.

The gas expander cycle efficiently provides refrigeration to fluids which are also cooling over a temperature range, and is particularly useful in providing for very low temperature refrigeration such as that required in producing liquid nitrogen and hydrogen.

A disadvantage of the gas expander refrigeration cycle, however, is that it is relatively inefficient at providing warm refrigeration. The net work required for a gas expander cycle refrigerator is equal to the difference between the compressor work and the expander work, while the work for a cascade or single component refrigeration cycle is simply the compressor work. In the gas expander cycle, expansion work can easily be 50% or more of the compressor work when providing warm refrigeration. The problem with the gas expander cycle in providing warm refrigeration is that any inefficiency in the compressor system is multiplied.

The objective of the present invention is to exploit the benefits of the gas expander cycle in providing cold refrigeration while utilizing the benefits of pure or multicomponent vapor recompression refrigeration cycles in providing warm refrigeration, and applying this combination of refrigeration cycles to gas liquefaction. This combination refrigeration cycle is particularly useful in the liquefaction of natural gas.

According to the invention, mixed component, pure component, and/or cascaded vapor recompression refrigeration systems are used to provide a portion of the refrigeration needed for gas liquefaction at temperatures below about −40° C. and down to about −100° C. The residual refrigeration in the coldest temperature range below about −100° C. is provided by work expansion of a refrigerant gas. The recirculation circuit of the refrigerant gas stream used for work expansion is physically independent from but thermally integrated with the recirculation circuit or circuits of the pure or mixed component vapor recompression cycle or cycles. More than 5% and usually more than 10% of the total refrigeration power required for liquefaction of the feed gas can be consumed by the pure or mixed component vapor recompression cycle or cycles. The invention can be implemented in the design of a new liquefaction plant or can be utilized as a retrofit or expansion of an existing plant by adding the gas expander cooling circuit to the existing plant refrigeration system.

The pure or mixed component vapor recompression working fluid or fluids generally comprise one or more components chosen from nitrogen, hydrocarbons having one or more carbon atoms, and halocarbons having one or more carbon atoms. Typical hydrocarbon refrigerants include methane, ethane, propane, i-butane, butane, and i-pentane. Representative halocarbon refrigerants include R22, R23, R32, R134a, and R410a. The gas stream to be work expanded in the gas expander cycle can be a pure component or a mixture of components; examples include a pure nitrogen stream or a mixture of nitrogen with other gases such as methane.

The method of providing refrigeration using a mixed component circuit includes compressing a mixed component stream and cooling the compressed stream using an external cooling fluid such as air, cooling water, or another process stream. A portion of the compressed mixed refrigerant stream is liquefied after external cooling. At least a portion of the compressed and cooled mixed refrigerant stream is further cooled in a heat exchanger and then reduced in pressure and vaporized by heat exchange against the gas stream being liquefied. The evaporated and warmed mixed refrigerant steam is then recirculated and compressed as described above.

The method of providing refrigeration using a pure component circuit consists of compressing a pure component stream and cooling it using an external cooling fluid, such as air, cooling water, another pure component stream. A portion of the refrigerant stream is liquefied after external cooling. At least a portion of the compressed and liquefied refrigerant is then reduced in pressure and vaporized by heat exchange against the gas stream being liquefied or against another refrigerant stream being cooled. The resulting vaporized refrigerant steam is then compressed and recirculated as described above.

According to the invention, the pure or mixed component vapor recompression cycle or cycles preferably provide refrigeration to temperature levels below about −40° C., preferably below about −60° C., and down to about −100° C., but do not provide the total refrigeration needed for liquefying the feed gas. These cycles typically may consume more than 5%, and usually more than 10%, of the total refrigeration power requirement for liquefaction of the feed gas. In the liquefaction of natural gas, pure or mixed component vapor recompression cycle or cycles typically can consume greater than 30% of the total power requirement required to liquefy the feed gas. In this application, the natural gas preferred is cooled to temperatures well below −40° C., and preferably below −60° C., by the pure or mixed component vapor recompression cycle or cycles.

The method of providing refrigeration in the gas expander cycle includes compressing a gas stream, cooling the compressed gas stream using an external cooling fluid, further cooling at least a portion of the cooled compressed gas stream, expanding at least a portion of the further cooled stream in an expander to produce work, warming the expanded stream by heat exchange against the stream to be liquefied, and recirculating the warmed gas stream for further compression. This cycle provides refrigeration at temperature levels below the temperature levels of the refrigeration provided by the pure or mixed refrigerant vapor recompression cycle.

In a preferred mode, the pure or mixed component vapor recompression cycle or cycles provide a portion of the cooling to the compressed gas stream prior to its expansion in an expander. In an alternative mode, the gas stream may be expanded in more than one expander. Any known expander arrangement to liquefy a gas stream may be used. The invention may utilize any of a wide variety of heat exchange devices in the refrigeration circuits including plate-fin, wound coil, and shell and tube type heat exchangers, or combinations thereof, depending on the specific application. The invention is independent of the number and arrangement of the heat exchangers utilized in the claimed process.

A preferred embodiment of the invention illustrated in FIG. 1. The process can be used to liquefy any feed gas stream, and preferably is used to liquefy natural gas as described below to illustrate the process. Natural gas is first cleaned and dried in pretreatment section 172 for the removal of acid gases such as $CO_2$ and $H_2S$ along with other contaminants such as mercury. Pre-treated gas [steam] *stream* 100 enters heat exchanger 106, is cooled to a typical intermediate temperature of approximately −30° C., and cooled stream 102 flows into scrub column 108. The cooling in heat exchanger 106 is effected by the warming of mixed refrigerant stream 125 in the interior 109 of heat exchanger 106. The mixed refrigerant typically contains one or more hydrocarbons selected from methane, ethane, propane, i-butane, butane, and possibly i-pentane. Additionally, the refrigerant may contain other components such as nitrogen. In scrub column 108, the heavier components of the natural gas feed, for example pentane and heavier components, are removed. In the present examples the scrub column is shown with only a stripping section. In other instances a rectifying section with a condenser can be employed for removal of heavy contaminants such as benzene to very low levels. When very low levels of heavy components are required in the final LNG product, any suitable modification to scrub column [110] *108* can be made. For example, a heavier component such as butane may be used as the wash liquid.

Bottoms product 110 of the scrub column then enters fractionation section 112 where the heavy components are recovered as stream 114. The propane and lighter components in stream 118 pass through heat exchanger 106, where the stream is cooled to about −30° C., and recombined with the overhead product of the scrub column to form purified feed stream 120. Stream 120 is then further cooled in heat exchanger [122] *106* to a typical temperature of about −100° C. by warming mixed refrigerant stream [124] *125*. The resulting cooled stream 126 is then further cooled to a temperature of about −166° C. in heat exchanger 128. Refrigeration for cooling in heat exchanger 128 is provided by cold refrigerant fluid stream 130 from turbo-expander 166. This fluid, preferably nitrogen, is predominantly vapor containing less than 20% liquid and is at a typical pressure of about 11 bara (all pressures herein are absolute pressures) and a typical temperature of about −168° C. Further cooled stream 132 can be flashed adiabatically to a pressure of about 1.05 bara across throttling valve 134. Alternatively, pressure of further cooled stream 132 could be reduced across a work expander. The liquefied gas then flows into separator or storage tank 136 and the final LNG product is withdrawn as stream 142. In some cases, depending on the natural gas composition and the temperature exiting heat exchanger 128, a significant quantity of light gas is evolved as stream 138 after the flash across valve 134. This gas can be warmed in heat exchangers 128 and 150 and compressed to a pressure sufficient for use as fuel gas in the LNG facility.

Refrigeration to cool the natural gas from ambient temperature to a temperature of about −100° C. is provided by a [mufti] *multi*-component refrigeration loop as mentioned above. Stream 146 is the high pressure mixed refrigerant which enters heat exchanger 106 at ambient temperature and a typical pressure of about 38 bara. The refrigerant is cooled to a temperature of about −100° C. in heat [exchangers] *exchanger* 106 [and 122], exiting as stream 148. Stream 148 is divided into two portions in this embodiment. A smaller portion, typically about 4%, is reduced in pressure adiabatically to about 10 bara and is introduced as stream 149 into heat exchanger 150 to provide supplemental refrigeration as described below. The major portion of the refrigerant as stream [124] *125* is also reduced in pressure adiabatically to a typical pressure of about 10 bara and is introduced to the cold end of heat exchanger 106. The refrigerant flows downward and vaporizes in interior 109 of heat exchanger 106 and leaves at slightly below ambient temperature as stream 152. Stream 152 is then re-combined with minor stream 154 which was vaporized and warmed to near ambient temperature in heat exchanger 150. The combined low pressure stream 156 is then compressed in multi-stage intercooled compressor 158 back to the final pressure of about 38 bara. Liquid can be formed in the intercooler of the compressor, and this liquid is separated and recombined with the main stream 160 exiting final stage of compression. The combined stream is then cooled back to ambient temperature to yield stream 146.

Final cooling of the natural gas from about −100° C. to about −166° C. is accomplished using a gas expander cycle employing nitrogen as the working fluid. High pressure nitrogen stream 162 enters heat exchanger 150 typically at ambient temperature and a pressure of about 67 bara, and is then cooled to a temperature of about −100° C. in heat exchanger 150. Cooled vapor stream 164 is substantially isentropically work expanded in turbo-expander 132, typically exiting at a pressure of about 11 bara and a temperature of about −168° C. Ideally the exit pressure is at or slightly below the dewpoint pressure of the nitrogen at a temperature cold enough to effect the cooling of the LNG to the desired temperature. Expanded nitrogen stream 130 is then warmed to near ambient temperature in heat exchangers 128 and 150. Supplemental refrigeration is provided to heat exchanger 150 by a small steam 149 of the mixed refrigerant, as described earlier, and this is done to reduce the irreversibility in the process by causing the cooling curves heat exchanger 150 to be more closely aligned. From heat exchanger 150, warmed low pressure nitrogen stream 170 is compressed in multistage compressor 168 back to a high pressure of about 67 bara.

As mentioned above, this gas expander cycle can be implemented as a retrofit or expansion of an existing mixed refrigerant LNG plant.

Figure 2:
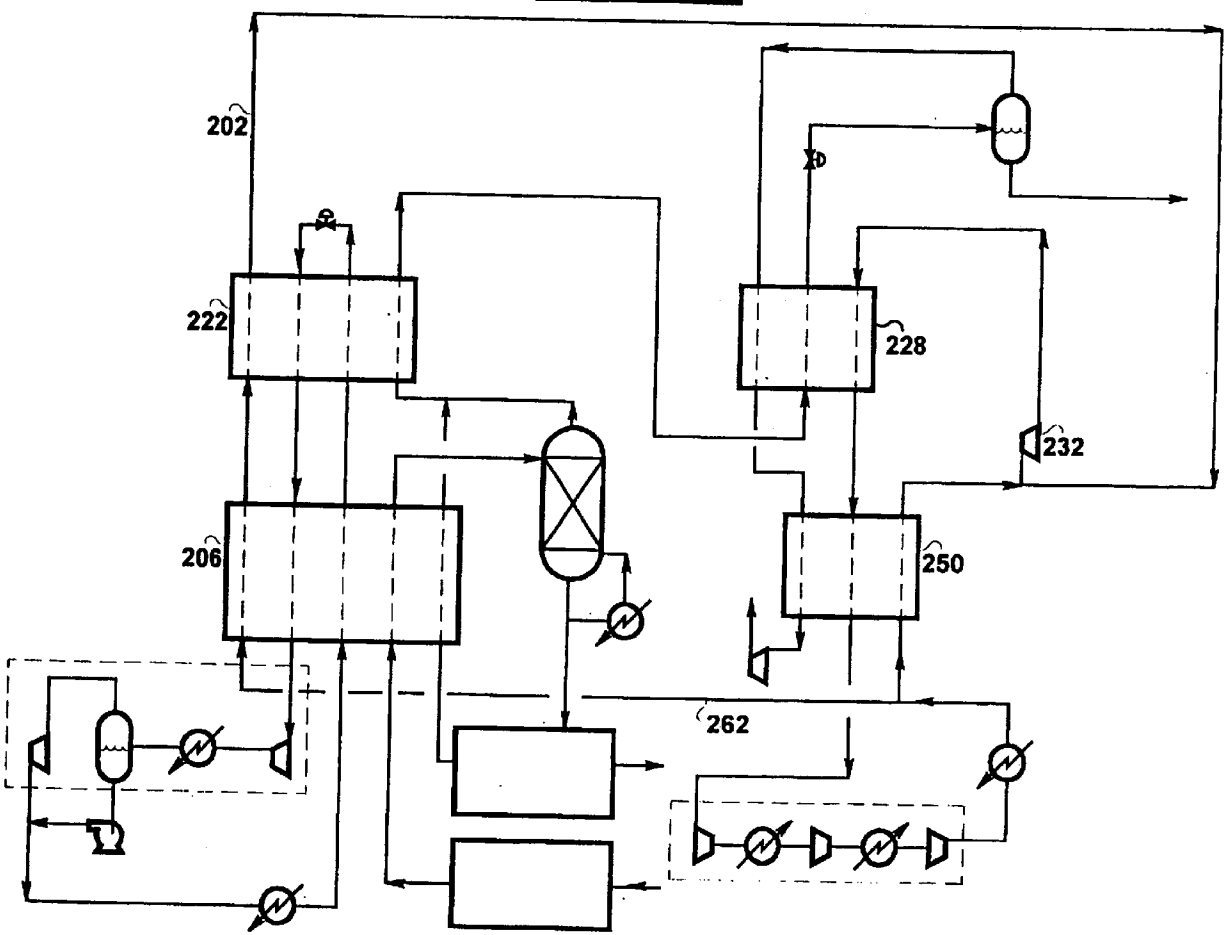
FIG. 2 is a schematic flow diagram of another embodiment of the present invention which utilizes an alternative method for pre-cooling the recirculating refrigerant in the gas expander refrigeration cycle.

An alternative embodiment of the invention is illustrated in FIG. 2. Instead of the wound coil heat exchangers 106 and 128 shown in FIG. 1, this alternative utilizes plate and fin heat exchangers 206, 222, and 228 along with plate and fin heat exchanger 250. In this embodiment, the irreversibility in the warm nitrogen heat exchanger 250 is reduced by decreasing the flow of the cooling streams rather than by increasing the flow of warming streams. In either case the effect is similar and the cooling curves heat exchanger 250 become more closely aligned. In the embodiment of FIG. 2, a small portion of the warm high pressure nitrogen as stream 262 is cooled in heat exchangers 206 and 222 to a temperature of about −100° C., exiting as stream 202. Stream 202 is then re-combined with the main high pressure nitrogen flow and expanded in work expander 232.

Figure 3:
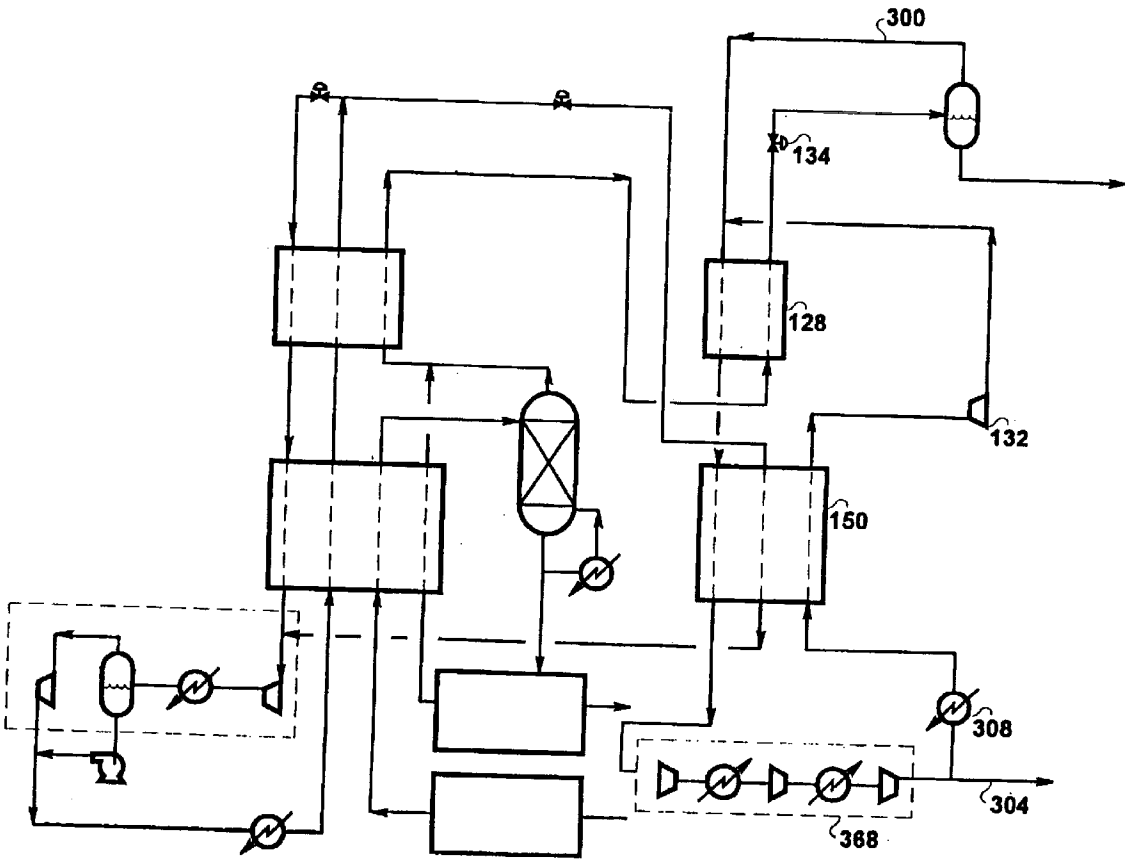
FIG. 3 is a schematic flow diagram of another embodiment of the present invention which utilizes product flash gas as the refrigerant in the gas expander refrigeration cycle.

FIG. 3 illustrates another alternate embodiment of the invention. In this embodiment, the working fluid for the gas expander refrigeration loop is a hydrocarbon-nitrogen mixture from the light vapor stream 300 evolved by flashing the liquefied gas from heat exchanger 128 across valve 134. This vapor is then combined with the fluid exiting turbo-expander 132, warmed in heat exchangers 128 and 150, and compressed in compressor 368. The gas exiting compressor 368 is then cooled in heat exchanger 308. The bulk of the gas exiting 308 is passed into heat exchanger 150 and small portion 304, equal in flow to the flow of flash gas stream 300, is withdrawn from the circuit for as fuel gas for the LNG facility. In this embodiment, the functions of fuel gas compressor 140 and recycle compressor 168 of FIG. 1 are combined in compressor 368. It is also possible to withdraw stream 304 from an interstage location of recycle compressor 368.

Figure 4:
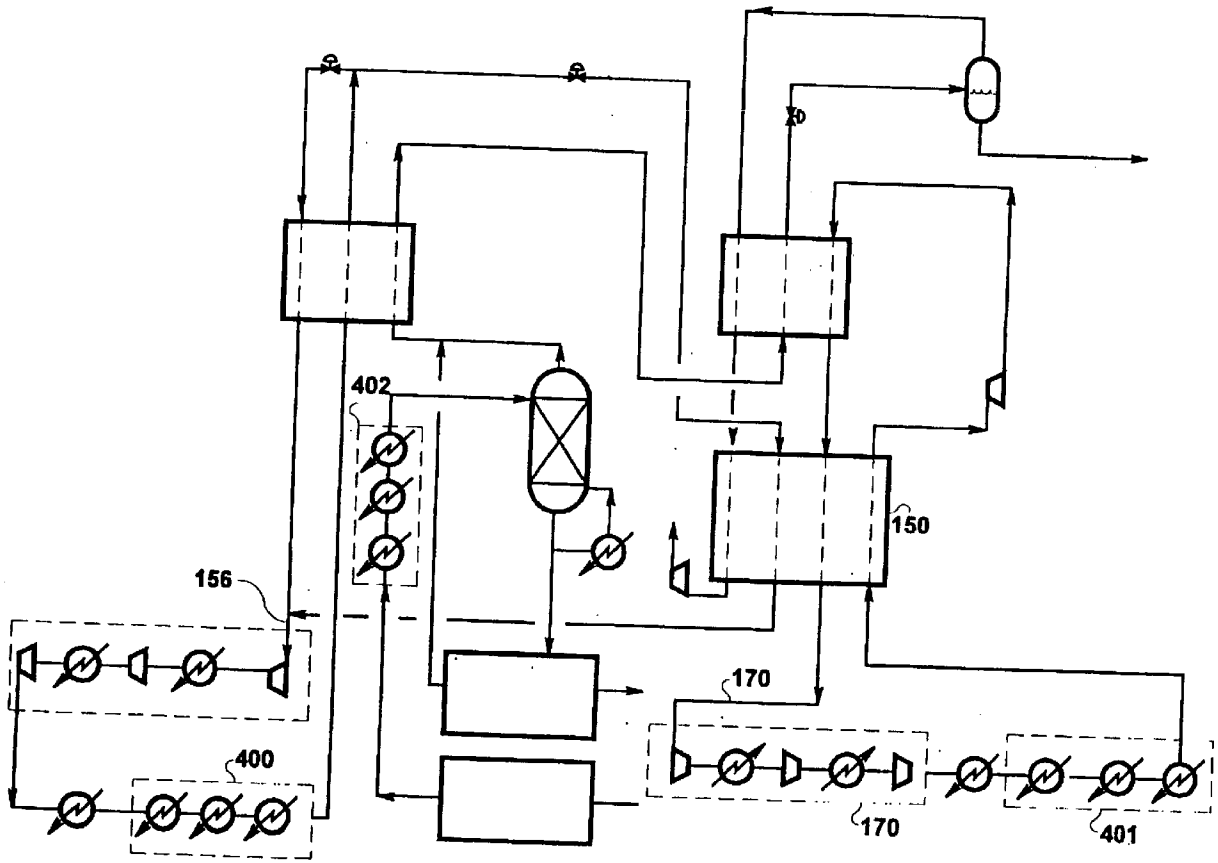
FIG. 4 is a schematic flow diagram of another embodiment of the present invention which utilizes an additional refrigeration system to pre-cool the feed gas, the compressed refrigerant in the vapor recompression refrigeration cycle, and the compressed refrigerant in the gas expander refrigeration cycle.

An alternate embodiment is illustrated in FIG. 4 in which another refrigerant (for example propane) is used to pre-cool the feed, nitrogen, and mixed refrigerant streams in heat exchangers 402, 401, and 400 respectively before introduction into heat exchangers 106 and 150. In this embodiment, three levels of pre-cooling are used in heat exchangers 402, 401, and 400, although any number of levels can be used as required. In this case, returning refrigerant fluids 156 and 170 are compressed cold, at an inlet temperature slightly below that provided by the pre-cooling refrigerant. This arrangement could be implemented as a retrofit or expansion of an existing propane pre-cooled mixed refrigerant LNG plant.

Figure 5:
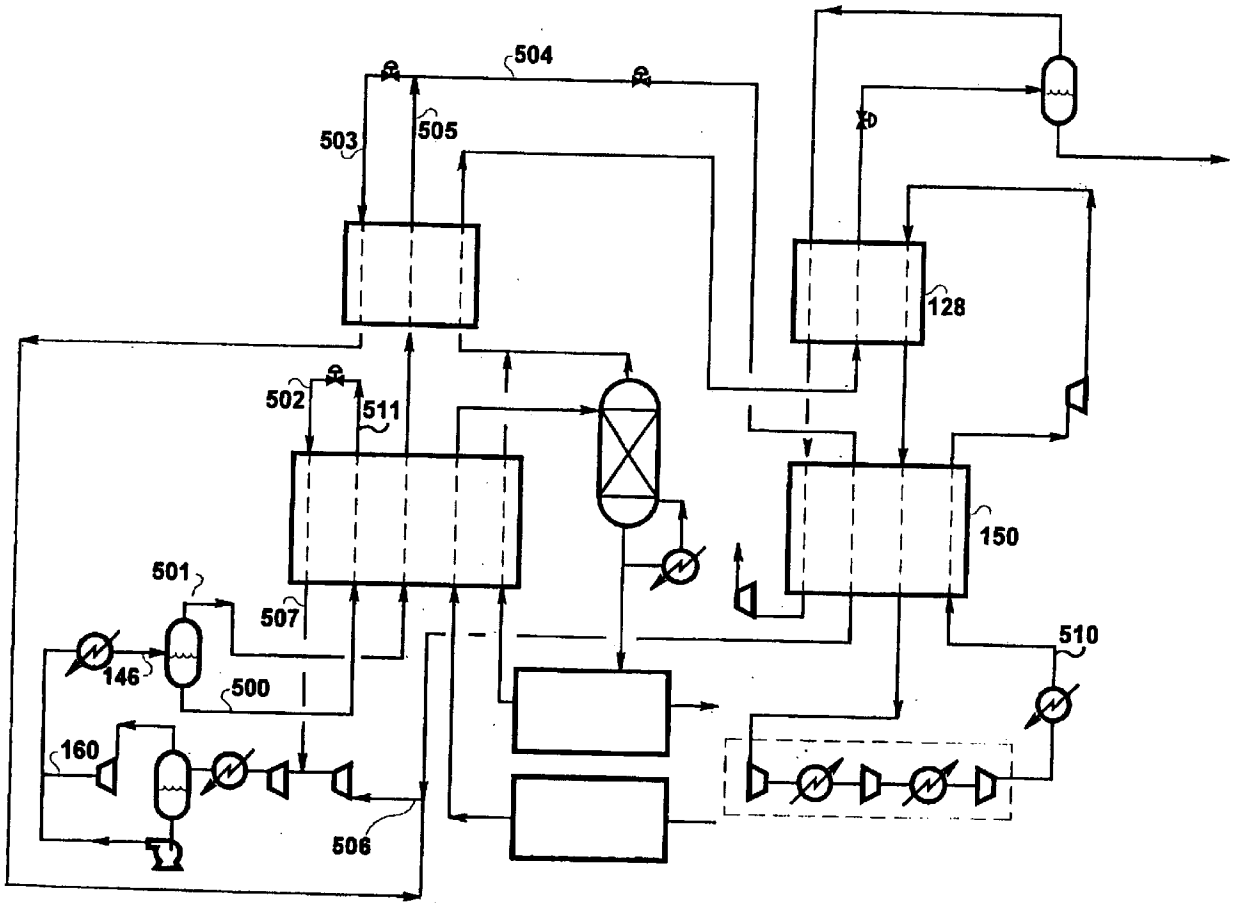
FIG. 5 is a schematic flow diagram of another embodiment of the present invention which utilizes an additional liquid mixed refrigerant stream in the vapor recompression refrigeration cycle.

FIG. 5 shows another embodiment of the invention in which high pressure mixed refrigerant stream 146 is separated into liquid and vapor sub-streams 500 and 501. Vapor stream 501 is cooled to about −100° C., substantially liquefied, reduced to a low pressure of about 3 bars, and used as stream 503 to provide refrigeration. Liquid stream 500 is cooled to about −30° C., is reduced to an intermediate pressure of about 9 bara, and used as stream 502 to provide refrigeration. A minor portion of cooled vapor stream 505 is used as stream 504 to provide supplemental refrigeration to heat exchangers 150 as earlier described.

The two vaporized low pressure mixed refrigerant return streams are combined to form stream 506, which is then compressed cold at a temperature of about −30° C. to an intermediate pressure of about 9 bara and combined with vaporized intermediate pressure stream 507. The resulting mixture is then further compressed to a final pressure of about 50 bara. In this embodiment, liquid is formed in the intercooler of the compressor, and this liquid is recombined with the main flow 160 exiting the final compression stage.

Optionally, compressed nitrogen stream 510 could be cooled before entering heat exchanger 150 by utilizing subcooled refrigerant liquid stream 511 (not shown). A portion of stream 511 could be reduced in pressure and vaporized to cool stream 510 by indirect heat exchange, and the resulting vapor would be returned to the refrigerant compressor. Alternatively, stream 510 could be cooled with other process streams in the heat exchanger cooled by vaporizing refrigerant stream 502.

Figure 6:
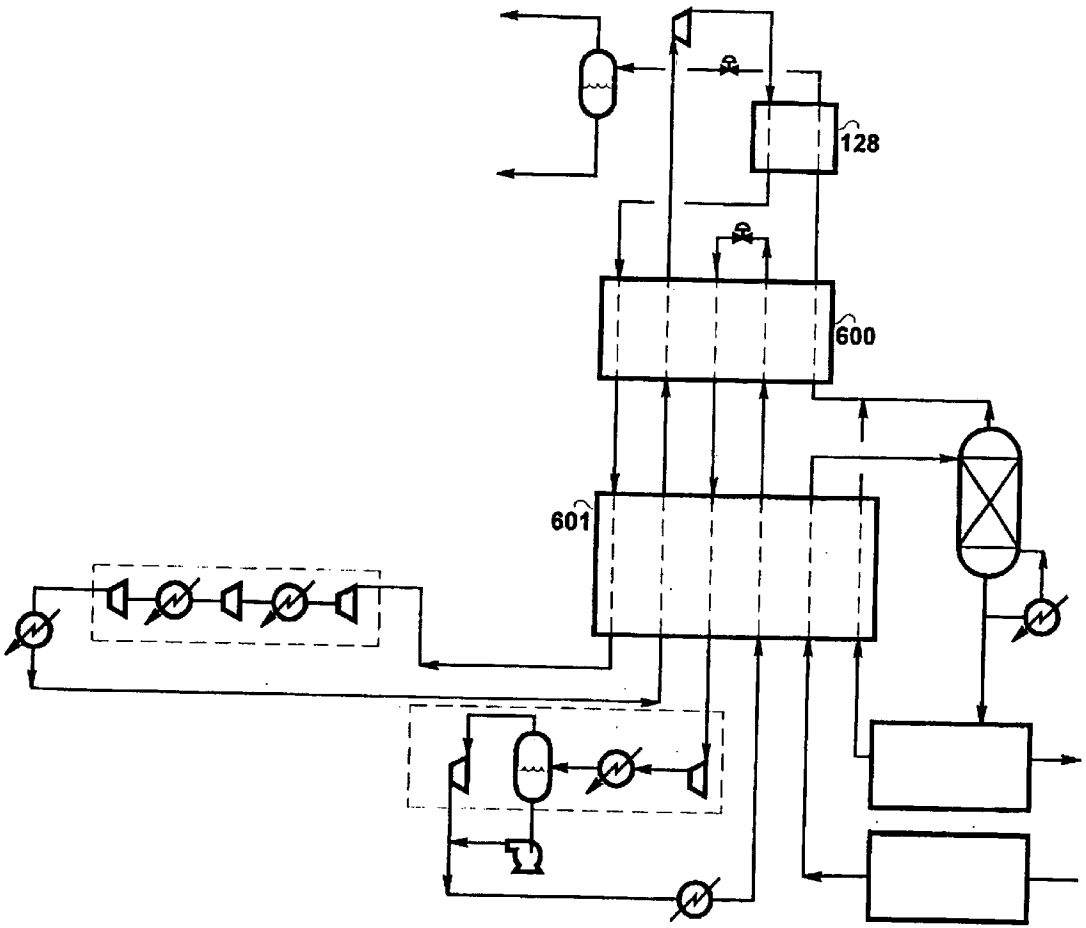
FIG. 6 is a schematic flow diagram of another embodiment of the present invention in which heat exchange among the feed gas and two refrigeration systems is consolidated into a minimum number of heat exchange zones.

Another embodiment is shown in FIG. 6 in which heat exchangers 122, 106 and 150 of FIG. 1 are combined functionally into heat exchangers 600 and 601 to yield an equipment simplification. Note that a balancing stream such as stream 168 of FIG. 1 is no longer required. In this embodiment, the vaporizing mixed refrigerant circuit and the gas expander refrigeration circuit provide in heat exchanger 601 a portion of the total refrigeration required to liquefy the feed gas. These two refrigeration circuits also provide in heat exchanger 600 another portion of the total refrigeration required to liquefy the feed gas. The remainder of the total refrigeration required to liquefy the feed gas is provided in heat exchanger 128.

Figure 7:
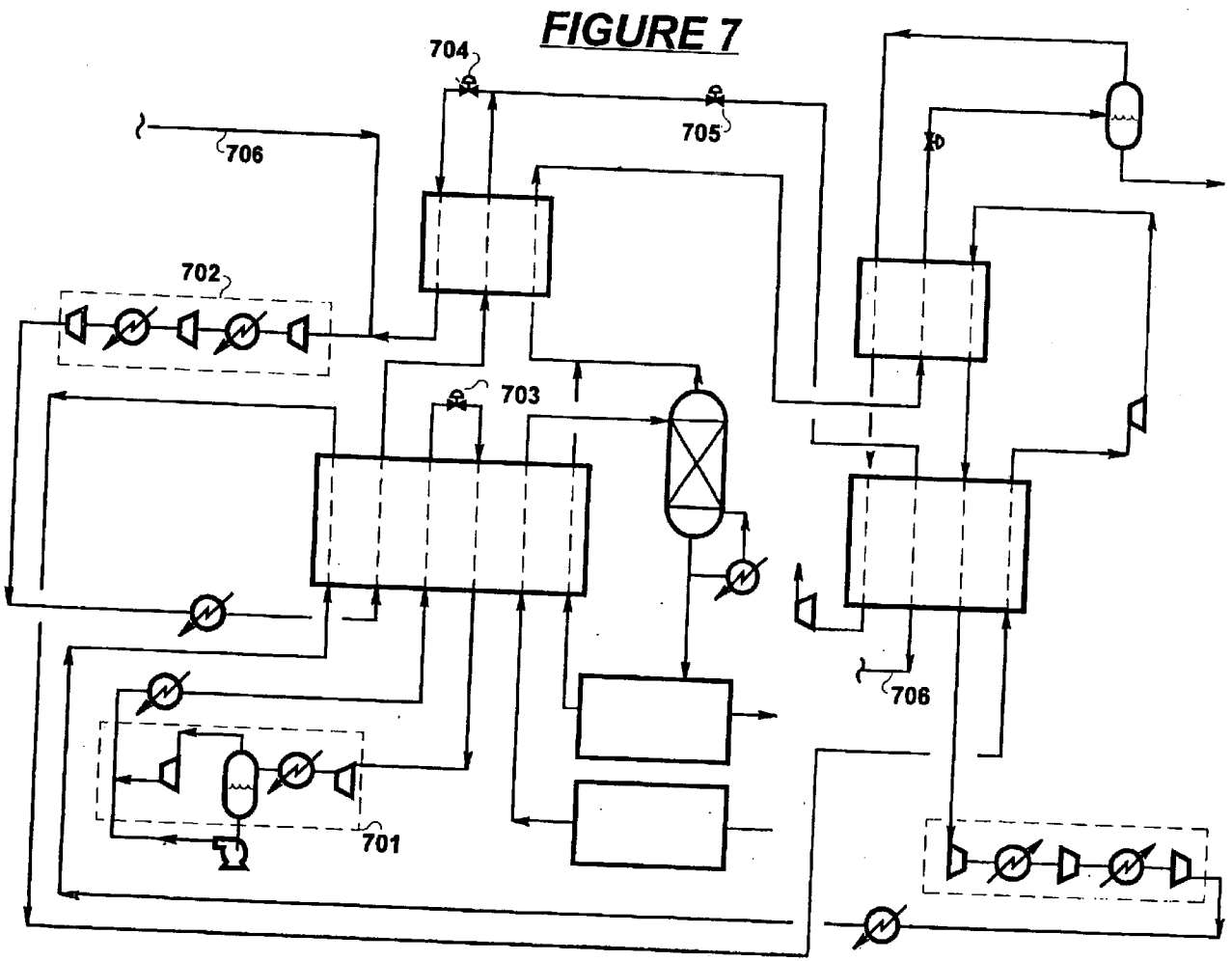
FIG. 7 is a schematic flow diagram of another embodiment of the present invention which utilizes an additional vapor recompression refrigeration system.

FIG. 7 presents an embodiment of the invention in which two separate mixed refrigerant loops are employed before final cooling by the gas expander refrigeration loop. The first refrigeration loop employing compressor 701 and pressure reduction device 703 provides primary cooling to a temperature of about −30° C. A second refrigeration loop employing compressor 702 and expansion devices 704 and 705 is used to provide further cooling to a temperature of about −100° C. This arrangement could be implemented as a retrofit or expansion of an existing dual mixed refrigerant LNG plant.

Figure 8:
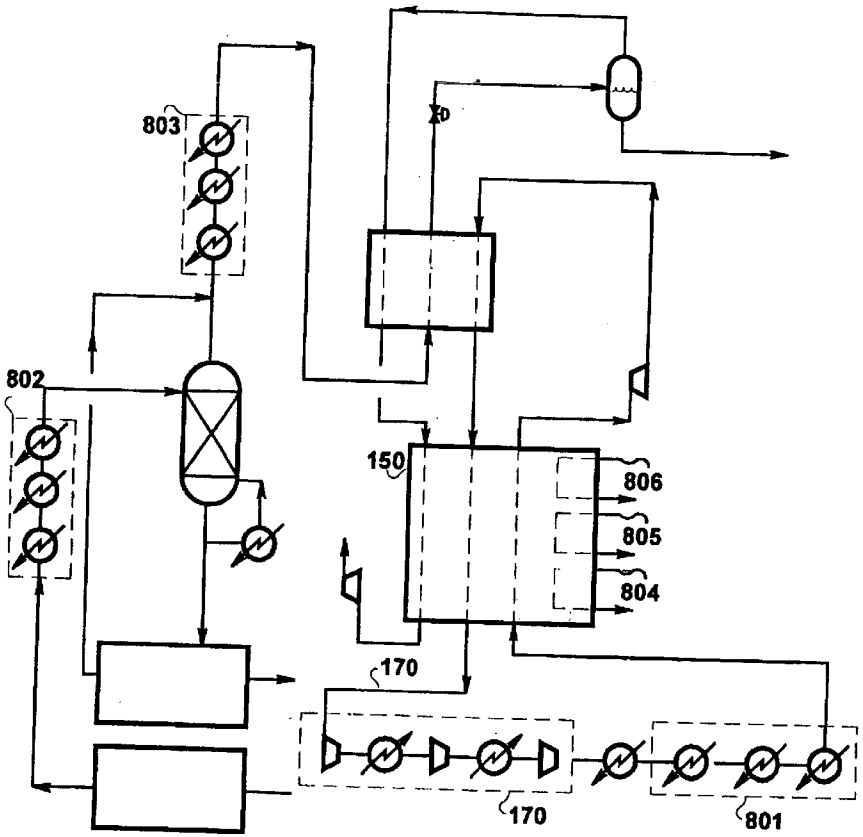
FIG. 8 is a schematic flow diagram of another embodiment of the present invention which utilizes a cascade refrigeration cycle to precool the feed gas.

FIG. 8 presents an embodiment of the invention in which a two-fluid cascade cycle is used to provide precooling prior to final cooling by the gas expander refrigeration cycle.

Figure 9:
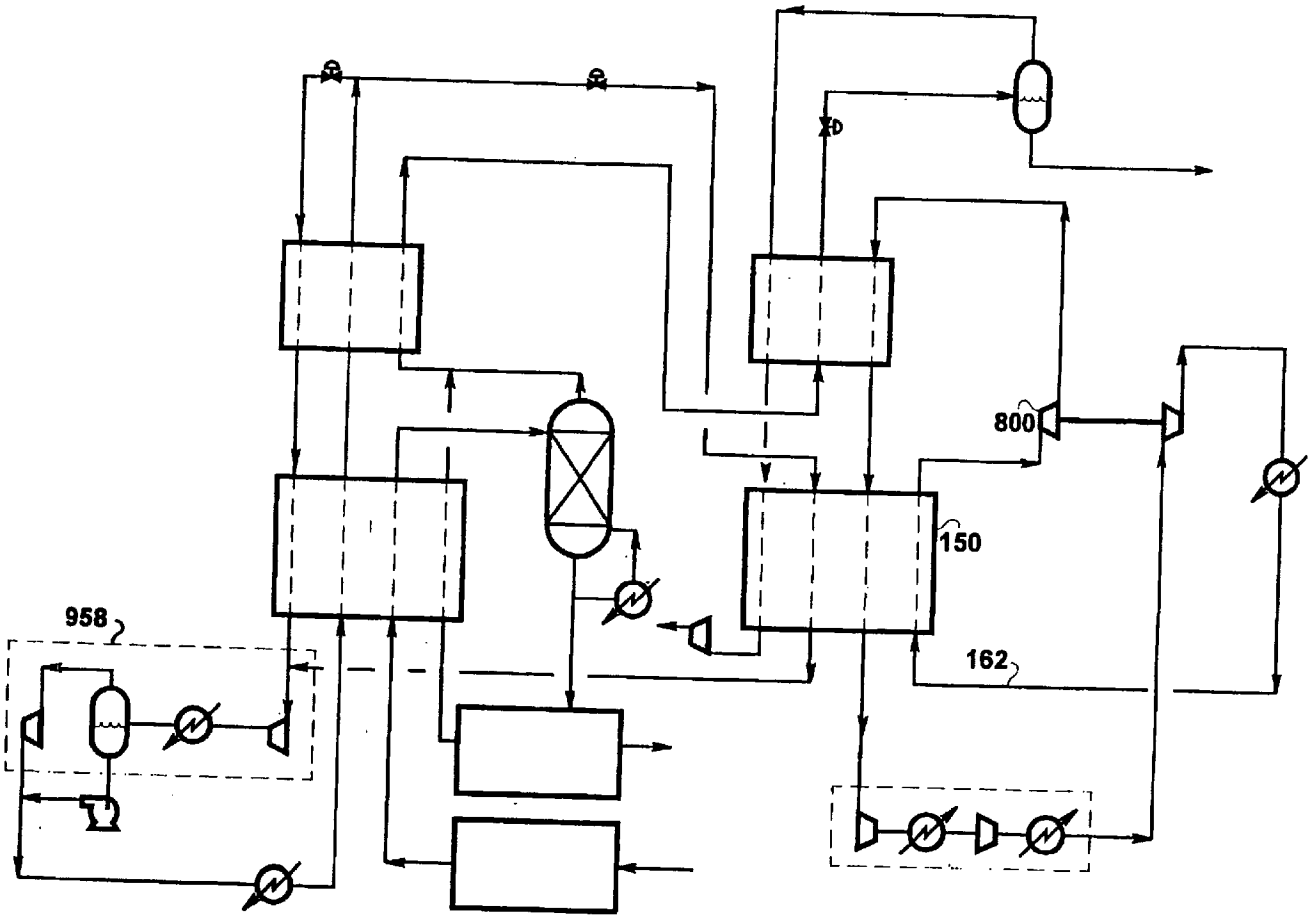
FIG. 9 is a schematic flow diagram of another embodiment of the present invention which utilizes expander work to provide a portion of the compression work in the gas expander refrigeration cycle.

FIG. 9 illustrates the use of expander 800 to drive the final compressor stage of the compressor for the gas expander refrigeration circuit. Alternatively, work generated by expander 800 can be used to compress other process streams. For example, a portion or all of this work could be used to compress the feed gas in line 900. In another option, a portion or all of the work from expander 800 could be used for a portion of the work required by mixed refrigerant compressor 958.

The invention described above in the embodiments illustrated by FIGS. 1–9 can utilize any of a wide variety of heat exchange devices in the refrigeration circuits including wound coil, plate-fin, shell and tube, and kettle type heat exchangers. Combinations of these types of heat exchangers can be used depending upon specific applications. For example in FIG. 2, all four heat exchangers [106] *206*, [122] *222*, [128] *228*, and [150] *250* can be wound coil exchangers. Alternatively, heat exchangers [106] *206*, [122] *222*, [128] *and 228* can be wound coil exchangers and heat exchanger [150] *250* can be a plate and fin type exchanger as utilized in FIG. 1.

In the preferred embodiment of the invention, the majority of the refrigeration in the temperature range of about −40° C. to about −100° C. is provided by indirect heat exchange with at least one vaporizing refrigerant in a recirculating refrigeration circuit. Some of the refrigeration in this temperature range also can be provided by the work expansion of a pressurized gaseous refrigerant.

EXAMPLE

Referring to FIG. 1, natural gas is cleaned and dried in pretreatment section 172 for the removal of acid gases such as $CO_2$ and $H_2S$ along with other contaminants such as mercury. Pretreated feed gas 100 has a flow rate of 24,431 kg-mole/hr, a pressure of 66.5 bara, and a temperature of 32° C. The molar composition of the stream is as follows:

TABLE 1

Feed Gas Composition

| Component | Mole Fraction |
|---|---|
| Nitrogen | 0.009 |
| Methane | 0.9378 |
| Ethane | 0.031 |
| Propane | 0.013 |
| i-Butane | 0.003 |
| Butane | 0.004 |
| i-Pentane | 0.0008 |
| Pentane | 0.0005 |
| Hexane | 0.001 |
| Heptane | 0.0006 |

Pre-treated gas 100 [enter] *enters* first heat exchanger 106 and is cooled to a temperature of −31° C. before entering scrub column 108 as stream 102. The cooling is effected by the warming of mixed refrigerant stream [109] *125*, which has a flow of 554,425 kg-mole/hr and the following composition:

TABLE 2

Mixed Refrigerant Composition

| Component | Mole Fraction |
|---|---|
| Nitrogen | 0.014 |
| Methane | 0.343 |
| Ethane | 0.395 |
| Propane | 0.006 |
| i-Butane | 0.090 |
| Butane | 0.151 |

In scrub column 108, pentane and heavier components of the feed are removed. Bottoms product 110 of the scrub column enters fractionation section 112 where the heavy components are recovered as stream 114 and the propane and lighter components in stream 118 are recycled to heat exchanger 106, cooled to −31° C., and recombined with the overhead product of the scrub column to form stream 120. The flow rate of stream 120 is 24,339 kg-mole/hr.

Stream 120 is further cooled in heat exchanger [122] *106* to a temperature of −102.4° C. by warming mixed refrigerant stream [124] *125* which enters heat exchanger [122] *106* at a temperature of −104.0° C. The resulting stream [128] *126* is then further cooled to a temperature of −165.7° C. in heat exchanger 128. Refrigeration for cooling in heat exchanger 128 is provided by pure nitrogen stream 130 exiting turbo-expander 166 at −168.0° C. with a liquid fraction of 2.0%. The resulting LNG stream 132 is then flashed adiabatically to its bubble point pressure of 1.05 bara across valve 134. The LNG then enters separator 136 with the final LNG product exiting as stream 142. In this example, no light gas 138 is evolved after the flash across valve 134, and flash gas recovery compressor 140 is not required.

Refrigeration to cool the natural gas from ambient temperature to a temperature of −102.4° C. is provided by a multi-component refrigeration loop as mentioned above. Stream 146 is the high pressure mixed refrigerant which enters heat exchanger 106 at a temperature of 32° C. and a pressure of 38.6 bara. It is then cooled to a temperature of −102.4° C. in heat [exchangers] *exchanger* 106 [and 122], exiting as stream 148 at a pressure of 34.5 bara. Stream 148 is then divided into two portions. A smaller portion, 4.1%, is reduced in pressure adiabatically to 9.8 bara and introduced as stream 149 into heat exchanger 150 to provide supplemental refrigeration. The major portion [124] of the mixed refrigerant is also flashed adiabatically to a pressure of 9.8 bara and introduced as stream [124] *125* into the cold end of heat exchanger [122] *106*. Stream [124] *125* is warmed and vaporized in heat [exchangers 122 and] *exchanger* 106, finally exiting heat exchanger 106 at 29° C. and 9.3 bara as stream 152. Stream 152 is then recombined with *the* minor portion of the mixed refrigerant as stream 154 which has been vaporized and warmed to 29° C. in heat exchanger 150. The combined low pressure stream 156 is then compressed in 2-stage intercooled compressor 158 to the final pressure of 34.5 bara. Liquid is formed in the intercooler of the compressor, and this liquid is recombined with the main flow 160 exiting the final compressor stage. The liquid flow is 4440 kg-mole/hr.

Final cooling of the natural gas from −102.4° C. to −165.7° C. is accomplished using a closed loop gas expander type cycle employing nitrogen as the working fluid. The high pressure nitrogen stream 162 enters heat exchanger 150 at 32° C. and a pressure of about 67.1 bara and a flow rate of 40,352 kg-mole/hr, and is then cooled to a temperature of −102.4° C. in heat exchanger 150. The vapor stream 164 is substantially isentropically work-expanded in turbo-expander 166, exiting at −168.0° C. with a liquid fraction of 2.0%. The expanded nitrogen is then warmed to 29° C. in heat exchangers 128 and 150. Supplemental refrigeration is provided to heat exchanger 150 by stream 149. From heat exchanger 150, the warmed low pressure nitrogen is compressed in three-stage centrifugal compressor 168 from 10.5 bara back to 67.1 bara. In this illustrative Example, 65% of the total refrigeration power required to liquefy pretreated feed gas 100 is consumed by the recirculating refrigeration circuit in which refrigerant stream 146 is vaporized in heat exchangers 106 and 150 and the resulting vaporized refrigerant stream 156 is compressed in compressor 158.

Thus the present invention offers an improved refrigeration process for gas liquefaction which utilizes one or more vaporizing refrigerant cycles to provide refrigeration below about −40° C. and down to about −100° C., and utilizes a gas expander cycle to provide refrigeration below about −100° C. The gas expander cycle also may provide some of the refrigeration in the range of about −40° C. to about −100° C. Each of these two types of refrigerant systems is utilized in an optimum temperature range which maximizes the efficiency of the particular system. Typically, a significant fraction of the total refrigeration power required to liquefy the feed gas (more than 5% and usually more than 10% of the total) can be consumed by the vaporizing refrigerant cycle or cycles. The invention can be implemented in the design of a new liquefaction plant or can be utilized as a retrofit or expansion of an existing plant by adding gas expander refrigeration circuit to the existing plant refrigeration system.

The essential characteristics of the present invention are described completely in the foregoing disclosure. One skilled in the art can understand the invention and make various modifications without departing from the basic spirit of the invention, and without deviating from the scope and equivalents of the claims which follow.

What is claimed is:

1. A method for the liquefaction of a feed gas which comprises providing at least a portion of the total refrigeration required to cool and condense the feed gas by utilizing (a) a first refrigeration system comprising at least one recirculating refrigeration circuit, wherein the first refrigeration system utilizes two or more refrigerant components and provides refrigeration in a first temperature range; and (b) a second refrigeration system which provides refrigeration in a second temperature range by work expanding a pressurized gaseous refrigerant stream;

wherein the first [recirculating] refrigeration system is operated by (1) compressing a first gaseous refrigerant;

(2) cooling and at least partially condensing the resulting compressed refrigerant;

(3) reducing the pressure of the resulting at least partially condensed compressed refrigerant;

(4) vaporizing the resulting reduced-pressure refrigerant to provide refrigeration in the first temperature range and yield a vaporized refrigerant; and (5) recirculating the vaporized refrigerant to provide the first gaseous refrigerant of (1);

wherein at least a portion of the cooling in (2) is provided by indirect heat exchange with one or more additional vaporizing refrigerant streams provided by a third [recirculating] refrigeration [circuit] *system*.

2. The method of claim 1 wherein the third [recirculating] refrigeration [circuit] *system* utilizes a single component refrigerant.

3. The method of claim 1 wherein the third [recirculating] refrigeration [circuit] *system* utilizes a mixed refrigerant comprising two or more components.

4. A method for the liquefaction of a feed gas which comprises providing at least a portion of the total refrigeration required to cool and condense the feed gas by utilizing (a) a first refrigeration system comprising at least one recirculating refrigeration circuit, wherein the first refrigeration system utilizes two or more refrigerant components and provides refrigeration in a first temperature range; and (b) a second refrigeration system which provides refrigeration in a second temperature range by work expanding a pressurized gaseous refrigerant stream;

wherein the second [reciculating]refrigeration system is operated by (1) compressing a second gaseous refrigerant to provide the pressurized gaseous refrigerant in (b);

(2) cooling the pressurized gaseous refrigerant to yield a cooled gaseous refrigerant;

(3) working expanding the cooled gaseous refrigerant to provide the cold refrigerant in (b);

(4) warming the cold refrigerant to provide refrigeration in the second temperature range; and (5) recirculating the resulting warmed refrigerant to provide the second gaseous refrigerant of (1);

wherein at least a portion of the cooling in (2) is provided by indirect heat exchange with one or more additional vaporizing refrigerant*s* provided by a third [recirculating] refrigeration [circuit] *system*.

5. The method of claim 4 wherein the third [recirculating] refrigeration [circuit] *system* utilizes a single component refrigerant.

6. The method of claim 4 wherein the third [recirculating] refrigeration [circuit] *system* utilizes a mixed refrigerant which comprises two or more components.

7. A method for the liquefaction of a feed gas which comprises providing at least a portion of the total refrigeration required to cool and condense the feed gas by utilizing (a) a first refrigeration system comprising at least one recirculating refrigeration circuit, wherein the first refrigeration system utilizes two or more refrigerant components and provides refrigeration in a first temperature range; and (b) a second refrigeration system which provides refrigeration in a second temperature range by work expanding a pressurized gaseous refrigerant stream;

wherein the first refrigerant system is operated by (1) compressing a first gaseous refrigerant;

(2) cooling and partially condensing the resulting compressed refrigerant to yield a vapor refrigerant fraction and a liquid refrigerant fraction;

(3) further cooling and reducing the pressure of the liquid refrigerant fraction, and vaporizing the resulting liquid refrigerant fraction to provide refrigeration in the first temperature range and yield a first vaporized refrigerant;

(4) cooling and condensing the vapor refrigerant fraction, reducing the pressure of at least a portion of the resulting liquid, and vaporizing the resulting liquid refrigerant fraction to provide additional refrigeration in the first temperature range and yield a second vaporized refrigerant; and (5) combining the first and second vaporized refrigerants to provide the first gaseous refrigerant of (1);

wherein vaporization of the resulting liquid in (4) is effected at a pressure lower than the vaporization of the resulting liquid refrigerant fraction in (3), and wherein the second vaporized refrigerant is compressed before combining with the first vaporized refrigerant.

8. A method for the liquefaction of a feed gas which comprises providing at least a portion of the total refrigeration required to cool and condense the feed gas by utilizing (a) a first refrigeration system comprising at least one recirculating refrigeration circuit, wherein the first refrigeration system utilizes two or more refrigerant components and provides refrigeration in a first temperature range; and (b) a second refrigeration system which provides refrigeration in a second temperature range by work expanding a pressurized gaseous refrigerant stream;

wherein the second refrigeration system is operated by (1) compressing a second gaseous refrigerant to provide the pressurized gaseous refrigerant in (b);

(2) cooling the pressurized gaseous refrigerant to yield a cooled gaseous refrigerant;

(3) work expanding the cooled gaseous refrigerant to provide the cold refrigerant in (b);

(4) warming the cold refrigerant to provide refrigeration in the second temperature range; and (5) recirculating the resulting warmed refrigerant to provide the second gaseous refrigerant of (1);

wherein the feed gas is natural gas, the resulting liquefied natural gas stream is flashed to lower pressure to yield a light flash vapor and a final liquid product, and the light flash vapor is used to provide the second gaseous refrigerant in the second [refrigerant circuit] *refrigeration system*.

*9. A method for the liquefaction of a feed gas which comprises providing at least a portion of the total refrigeration required to cool and condense the feed gas by utilizing*

*(a) a first refrigeration system comprising at least one recirculating refrigeration circuit, wherein the first refrigeration system utilizes two or more refrigerant components and provides refrigeration in a first temperature range; and*

*(b) a second refrigeration system which provides refrigeration in a second temperature range by work expanding a pressurized gaseous refrigerant stream;*

*wherein the second refrigeration system is operated by*

*(1) compressing a second gaseous refrigerant to provide the pressurized gaseous refrigerant in (b);*

*(2) cooling the pressurized gaseous refrigerant to yield a cooled gaseous refrigerant;*

*(3) work expanding the cooled gaseous refrigerant to provide the cold refrigerant in (b);*

*(4) warming the cold refrigerant to provide refrigeration in the second temperature range; and*

*(5) recirculating the resulting warmed refrigerant to provide the second gaseous refrigerant of (1);*

*wherein at least a portion of the pressurized gaseous refrigerant in (2) is entirely cooled separately from the cooling of the feed gas.*

*10. The method of claim 9 wherein all of the pressurized gaseous refrigerant is cooled separately from cooling of the feed gas.*

*11. The method of claim 9 wherein a portion of the pressurized gaseous refrigerant is cooled by indirect heat exchange with the at least one recirculating refrigeration circuit of (a).*

*12. The method of claim 9 wherein the first refrigeration system comprises a mixed component, pure component, and/or a cascaded vapor recompression refrigeration system.*

*13. An apparatus for the liquefaction of a feed gas comprising*

*(a) a first refrigeration system comprising at least one recirculating refrigeration circuit, wherein the first refrigeration system utilizes two or more refrigerant components and provides refrigeration in a first temperature range, wherein at least a portion of the first temperature range is between −40° C. and −100° C.; and*

*(b) a second refrigeration system which provides refrigeration in a second temperature range by work expanding a pressurized gaseous refrigerant stream, wherein at least a portion of the second temperature range is below −100° C.;*

*wherein the first refrigeration system comprises:*

*(1) compression means for comprising a first gaseous refrigerant;*

*(2) heat exchange means for cooling and at least partially condensing the resulting compressed refrigerant;*

*(3) means for reducing the pressure of the resulting at least partially condensed compressed refrigerant;*

*(4) heat exchange means for vaporizing the resulting reduced-pressure refrigerant to provide refrigeration in the first temperature range and yield a vaporized refrigerant; and*

*(5) means for recirculating the vaporized refrigerant to provide the first gaseous refrigerant of (1);*

*and wherein the apparatus comprises additional heat exchange means to provide at least a portion of the cooling of (2) by indirect heat exchange with one or more additional vaporizing refrigerant streams and a third refrigeration system to provide the one or more additional vaporizing refrigerant streams.*

*14. The apparatus of claim 13, wherein the second refrigeration system comprises*

*(6) compression means for compressing a second gaseous refrigerant to provide the pressurized gaseous refrigerant;*

*(7) heat exchange means for cooling the pressurized gaseous refrigerant to yield a cooled gaseous refrigerant;*

*(8) expansion means for work expanding the cooled gaseous refrigerant to provide the cold refrigerant;*

*(9) heat exchange means for warming the cold refrigerant to provide refrigeration in the second temperature range; and*

*(10) means for recirculating the resulting warmed refrigerant to provide the second gaseous refrigerant of (6).*

*15. The apparatus of claim 14, wherein at least one of the heat exchange means in the first and second refrigeration systems comprises a wound coil heat exchanger.*

*16. An apparatus for the liquefaction of a feed gas comprising*

*(a) a first refrigeration system comprising at least one recirculating refrigeration circuit utilizing two or more*

*refrigerant components and providing refrigeration in a first temperature range; and*

(*b*) *a second refrigeration system which provides refrigeration in a second temperature range having a lowest temperature less than the lowest temperature in the first temperature range;*

*wherein the second refrigeration system comprises*

(*1*) *compression means for compressing the second gaseous refrigerant to provide the pressurized gaseous refrigerant;*

(*2*) *heat exchange means for entirely cooling at least a portion of the pressurized gaseous refrigerant separately from cooling of the feed gas to yield at least a portion of the cooled gaseous refrigerant;*

(*3*) *expansion means for work expanding the cooled gaseous refrigerant to provide the cold refrigerant;*

(*4*) *heat exchange means for warming the cold refrigerant to provide refrigeration in the second temperature range; and*

(*5*) *means for recirculating the resulting warmed refrigerant to provide the second gaseous refrigerant of* (*1*).

*17. The apparatus of claim 16 wherein the heat exchange means of* (*2*) *cools all of the pressurized gaseous refrigerant separately from cooling of the feed gas.*

*18. The apparatus of claim 16 wherein the first refrigeration system comprises*

(*A*) *compression means for compressing the first gaseous refrigerant;*

(*B*) *heat exchange means for cooling and at least partially condensing the resulting compressed refrigerant;*

(*C*) *pressure reducing means for reducing the pressure of the resulting at least partially condensed compressed refrigerant;*

(*D*) *heat exchange means for vaporizing the resulting reduced-pressure refrigerant to provide refrigeration in the first temperature range and yield the vaporized refrigerant; and*

(*E*) *means for recirculating the vaporized refrigerant to provide the first gaseous refrigerant of* (*A*).

*19. The apparatus of claim 16 wherein at least a portion of the cooling in the heat exchanger of* (*2*) *is provided by indirect heat exchange by warming the cold refrigerant in* (*4*).

*20. The apparatus of claim 18 wherein at least one of the heat exchange means of the first and second refrigeration systems comprises a wound coil heat exchanger.*

* * * * *

UNITED STATES PATENT AND TRADEMARK OFFICE

CERTIFICATE OF CORRECTION

PATENT NO. : RE 39,637 E
APPLICATION NO. : 10/669121
DATED : May 22, 2007
INVENTOR(S) : Mark Julian Roberts and Rakesh Agrawal It is certified that error appears in the above-identified patent and that said Letters Patent is hereby corrected as shown below:

Column 16, Line 4
In claim 1 delete the words "[circuit] system" and insert the words -- system [circuit] --

Column 16, Line 6
In claim 2 delete the words "[circuit] system" and insert the words -- system [circuit] --

Column 16, Line 9
In claim 3 delete the words "[circuit] system" and insert the words -- system [circuit] --

Column 16, Line 22
In claim 4 delete the word "[reciculating]" and insert the word -- recirculating --

Column 16, Line 37
In claim 4 delete the words "[circuit] system" and insert the words -- system [circuit] --

Column 16, Line 39
In claim 5 delete the words "[circuit] system" and insert the words -- system [circuit] --

Column 16, Line 42
In claim 6 delete the words "[circuit] system" and insert the words -- system [circuit] --

Column 17, Line 66
In claim 9 delete the word "the" between the words "from" and "cooling"

Signed and Sealed this

Third Day of July, 2007

JON W. DUDAS
*Director of the United States Patent and Trademark Office*